United States Patent
Aoki et al.

(10) Patent No.: US 11,554,388 B2
(45) Date of Patent: Jan. 17, 2023

(54) METHOD FOR PROCESSING ELECTRONIC AND ELECTRICAL DEVICE COMPONENT SCRAP

(71) Applicant: JX NIPPON MINING & METALS CORPORATION, Tokyo (JP)

(72) Inventors: Katsushi Aoki, Hitachi (JP); Tsubasa Takeda, Hitachi (JP)

(73) Assignee: JX NIPPON MINING & METALS COPPORATION, Tokyo (JP)

( * ) Notice: Subject to any disclaimer, the term of this patent is extended or adjusted under 35 U.S.C. 154(b) by 0 days.

(21) Appl. No.: 16/981,649

(22) PCT Filed: Mar. 18, 2019

(86) PCT No.: PCT/JP2019/011292
§ 371 (c)(1),
(2) Date: Sep. 16, 2020

(87) PCT Pub. No.: WO2019/177176
PCT Pub. Date: Sep. 19, 2019

(65) Prior Publication Data
US 2021/0107034 A1   Apr. 15, 2021

(30) Foreign Application Priority Data

Mar. 16, 2018 (JP) .............................. JP2018-050076
Mar. 29, 2018 (JP) .............................. JP2018-065541
Mar. 29, 2018 (JP) .............................. JP2018-065562

(51) Int. Cl.
*B03C 1/16*   (2006.01)
*B07C 5/344*   (2006.01)
(Continued)

(52) U.S. Cl.
CPC .............. *B07C 5/344* (2013.01); *B03C 1/002* (2013.01); *B03C 1/16* (2013.01); *B07C 5/3422* (2013.01);
(Continued)

(58) Field of Classification Search
CPC ....... B07C 5/342; B07C 5/3422; B07C 5/344; B07C 5/363; B07C 5/366;
(Continued)

(56) References Cited

U.S. PATENT DOCUMENTS 6,568,612 B1    5/2003  Aoki et al.
6,696,655 B2 *  2/2004  Harbeck ................. B07C 5/344
                                                    209/571
(Continued)

FOREIGN PATENT DOCUMENTS

DE    100 31 260 A1    1/2001
EP    0661107 A2       7/1995
(Continued)

OTHER PUBLICATIONS

English translation of the International Preliminary Report on Patentability (Form PCT/IB/338) and Written Opinion of the International Searching Authority (Form PCT/ISA/237), dated Oct. 1, 2020, for International Application No. PCT/JP2019/011292.
(Continued)

*Primary Examiner* — Joseph C Rodriguez
(74) *Attorney, Agent, or Firm* — Birch, Stewart, Kolasch & Birch, LLP

(57) ABSTRACT

Provided is a method for processing electronic and electrical device component scrap, which can accurately and efficiently sort electronic and electrical device component scrap. The method for processing electronic and electrical device component scrap includes a separation step of separating non-metal objects $1b$ or metal objects $1a_1$, $1a_2$ from
(Continued)

electronic and electrical device component scrap 1 containing the metal objects $1a_1$, $1a_2$ and the non-metal objects $1b$ using a sorter 10 comprising a metal sensor 2, a color camera 3, an air valve 4, and a conveyor 5, wherein a fixed distance is provided between the metal objects $1a_1$, $1a_2$ adjacent to each other so as to prevent the non-metal objects $1b$ between the metal objects $1a_1$, $1a_2$ from being erroneously detected, when detecting the metal objects $1a_1$, $1a_2$ in the electronic and electrical device component scrap 1 by the metal sensor 2.

12 Claims, 5 Drawing Sheets

(51) Int. Cl.
  *B03C 1/00*   (2006.01)
  *B07C 5/342*  (2006.01)
  *B07C 5/36*   (2006.01)
(52) U.S. Cl.
  CPC .......... *B07C 5/365* (2013.01); *B03C 2201/20* (2013.01); *B07C 2501/0054* (2013.01)
(58) Field of Classification Search
  CPC .... B07C 2501/0018; B07C 2501/0036; B07C 2501/0054; B03C 1/002; B03C 1/16; B03C 1/30; B03C 2201/20
  See application file for complete search history.

(56) References Cited

U.S. PATENT DOCUMENTS

| | | | | |
|---|---|---|---|---|
| 7,674,994 | B1* | 3/2010 | Valerio | ................... B07C 5/344 209/571 |
| 2003/0094403 | A1 | 5/2003 | Murata et al. | |
| 2007/0262000 | A1* | 11/2007 | Valerio | ................... B07C 5/344 209/556 |
| 2011/0049021 | A1* | 3/2011 | Valerio | ................... B07C 5/368 209/571 |
| 2016/0274021 | A1 | 9/2016 | Tagawa et al. | |

FOREIGN PATENT DOCUMENTS

| | | | |
|---|---|---|---|
| JP | 6-106091 | A | 4/1994 |
| JP | 8-52449 | A | 2/1996 |
| JP | 9-78151 | A | 3/1997 |
| JP | 2000-343044 | A | 12/2000 |
| JP | 2001-58138 | A | 3/2001 |
| JP | 2001-96261 | A | 4/2001 |
| JP | 2002-210417 | A | 7/2002 |
| JP | 2003-156447 | A | 5/2003 |
| JP | 2003-236474 | A | 8/2003 |
| JP | 2004-283729 | A | 10/2004 |
| JP | 2007-29923 | A | 2/2007 |
| JP | 2009-532198 | A | 9/2009 |
| JP | 2012-139609 | A | 7/2012 |
| JP | 2013-685 | A | 1/2013 |
| JP | 2015-78913 | A | 4/2015 |
| JP | 2015-123418 | A | 7/2015 |
| JP | 2017-83348 | A | 5/2017 |
| WO | WO 2007/120467 | A2 | 10/2007 |

OTHER PUBLICATIONS

Japanese Office Action for corresponding Japanese Application No. 2018-065541, dated Aug. 31, 2021, with an English translation.
Japanese Office Action for corresponding Japanese Application No. 2018-065562, dated Aug. 31, 2021, with an English translation.
International Search Report for PCT/JP2019/011292 (PCT/ISA/210) dated Jun. 18, 2019.
Written Opinion of the International Searching Authority for PCT/JP2019/011292 (PCT/ISA/237) dated Jun. 18, 2019.
Extended European Search Report for corresponding European Application No. 19767092.0, dated Jan. 10, 2022.

* cited by examiner

METHOD FOR PROCESSING ELECTRONIC AND ELECTRICAL DEVICE COMPONENT SCRAP

FIELD OF THE INVENTION

The present invention relates to a method for processing electronic and electrical device component scrap. More particularly, it relates to a method for processing electronic and electrical device component scrap, which is suitable for recycling of used electronic and electrical devices.

BACKGROUND OF THE INVENTION

From the viewpoint of recent resource conservation, recovery of variable metals from electronic and electrical device component scrap such as waste electronic home appliances, PCs and mobile phones has increasingly become popular, and an efficient method for recovering the valuable metals has been studied. It is known that various components are contained in the electronic and electrical device component scrap. Manual sorting has the highest accuracy, but it has problems of requiring labor and of non-practical. Therefore, there is a need for development of a device for efficiently sorting desired components from the electronic and electrical device component scrap by using various sorters.

For example, Japanese Patent Application Publication No. 2017-83348 A (Patent Literature 1) describes an ore sorting method and device for sorting superior or defective ore. It also discloses an example of the ore sorting device in which ore-crushed product carried on a belt-shaped conveyer is imaged by an imaging device, and superior and defective ore are identified by an identifying device, and which is provided with an air spraying apparatus for blowing an air toward a spraying target so as to allow each moving trajectory of the superior and defective ore to be different.

However, the invention described in Patent literature 1 is a sorting method for processing an ore crushed material as a processing object, but it cannot be suitable for sorting the electronic and electrical device component scrap including various materials such as non-metal objects such as plastics and metal objects.

Japanese Patent Application Publication No. H09-78151 A (Patent Literature 2) discloses a recycling method for valuable metals, including the steps of charging scrap containing valuable metals into a flash furnace for smelting copper ores, and recovering the valuable metals into a mat that is retained in the furnace. According to such a recycling method, scrap processing can be combined with copper smelting in the copper smelting flash furnace, so that the valuable metals can be recovered at low cost even from scrap having a lower valuable metal content.

However, in the processing using the copper smelting flash furnace as disclosed in Patent Literature 2, an increased amount of the electronic and electrical device component scrap processed may lead to an increase in a carbon component contained in organic substances such as synthetic resins forming the electronic and electrical device component scrap, which may cause troubles due to over-reduction in the smelting furnace.

As one of methods for suppressing the generation of troubles due to over-reduction in the copper smelting flash furnace, it is also proposed that the electronic and electrical device component scrap is crushed before processing of the electronic and electrical device component scrap in a copper smelting flash furnace to reduce the volume. For example, Japanese Patent Application Publication No. 2015-123418 A (Patent Literature 3) discloses that electrical and electronic device component scrap containing copper is incinerated and then crushed to have a predetermined size or less, and the crushed electrical and electronic device component scrap is processed in a copper smelting furnace.

However, the increased amount of electronic and electrical device component scrap processed leads to introduction of a larger amount of unwanted substances (smelting inhibitors) for processing in the subsequent copper smelting step than in the prior arts, depending on types of substances contained in the electronic and electrical device component scrap. An increased amount of the smelting inhibitors introduced into such a copper smelting step arises a situation where an amount of the electronic and electrical device component scrap to be introduced has to be limited.

Conventionally, many efforts have been made for thermodynamic methods in a smelting step and purifying methods for electrolytic solutions in an electrolytic step of copper smelting, including the smelting inhibitors derived from natural ores. However, there are many problems in the method for processing the electronic and electrical device component scrap having very higher contents of the smelting inhibitors than the natural ores.

CITATION LIST

Patent Literatures

[Patent Literature 1] Japanese Patent Application Publication No. 2017-83348 A

[Patent Literature 2] Japanese Patent Application Publication No. H09-78151 A

[Patent Literature 3] Japanese Patent Application Publication No. 2015-123418 A

SUMMARY OF THE INVENTION

In view of the above problems, the present invention provides a method for processing electronic and electrical device component scrap, which can accurately and efficiently sort electronic and electrical device component scrap.

Further, the present invention provides a method for processing electronic and electrical device component scrap, which can increase an amount of electronic and electrical device component scrap processed in a smelting step and efficiently recover valuable metals.

As a result of intensive studies to solve the above problems, the present inventors have found that the synthetic resins (plastics) can be securely and efficiently separated from the electronic and electrical device component scrap by providing a fixed distance between metal objects adjacent to each other or between metal objects in which a non-metal object is at least present between the metal objects, so as to prevent the non-metal object present between the metal objects from being erroneously detected, when detecting the metal objects in the electronic and electrical device component scrap using a sorter provided with a metal sensor, a color camera, an air valve, and a conveyor.

In one aspect, the present invention completed based on the above findings provides a method for processing electronic and electrical device component scrap, the method comprising a separation step of separating non-metal objects or metal objects from electronic and electrical device component scrap containing the metal objects and the non-metal objects using a sorter comprising a metal sensor, a color camera, an air valve, and a conveyor, wherein a fixed distance is provided between the metal objects adjacent to each other so as to prevent the non-metal objects between the metal objects from being erroneously detected, when detecting the metal objects in the electronic and electrical device component scrap by the metal sensor.

In one embodiment of the method for processing electronic and electrical device component scrap according to the present invention, the fixed distance is larger than a length of a detection range for the metal sensor in a direction along a conveying direction of the electronic and electrical device component scrap.

In another aspect, the present invention provides a method for processing electronic and electrical device component scrap, the method comprising a separation step of separating non-metal objects or metal objects from electronic and electrical device component scrap containing the metal objects and the non-metal objects using a sorter comprising a metal sensor, a color camera, an air valve, and a conveyor, wherein a distance between the metal objects in which the non-metal objects are at least present between the metal objects is larger than a length of a detection range for the metal sensor in a direction along a conveying direction of the electronic and electrical device component scrap so as to prevent the non-metal objects between the metal objects from being erroneously detected, when detecting the metal objects in the electronic and electrical device component scrap by the metal sensor.

In still another embodiment of the method for processing electronic and electrical device component scrap according to the present invention, the length of the detection range for the metal sensor is from 4 to 200 mm.

In still another embodiment of the method for processing electronic and electrical device component scrap according to the present invention, an opening/closing speed of the air valve is from 0.5 to 4 ms/cycle.

In still another embodiment of the method for processing electronic and electrical device component scrap according to the present invention, the electronic and electrical device component scrap has a characteristic particle diameter of from 4 to 70 mm.

In still another embodiment, the method for processing electronic and electrical device component scrap according to the present invention further comprises a step of processing the electronic and electrical device component scrap after separating the non-metals in a smelting step.

In still another embodiment, the method for processing electronic and electrical device component scrap according to the present invention further comprises removing powdery materials contained in the electronic and electrical device component scrap before detecting the metal objects in the electronic and electrical device component scrap by the metal sensor.

In still another embodiment, the method for processing electronic and electrical device component scrap according to the present invention comprises adjusting a ratio of the metal objects to the non-metal objects contained in the electronic and electrical device component scrap to 70:30 to 20:80 before detecting the metal objects in the electronic and electrical device component scrap by the metal sensor.

In another aspect, the present invention provides a method for processing electronic and electrical device component scrap, the method comprising a metal sorting step of sorting metal objects or non-metal objects using a metal sorter, as a final step of physical sorting before introducing the electronic and electrical device component scrap into a smelting step, wherein a magnetic force sorting process is carried out as a pre-processing of the metal sorting step to adjust a ratio of the number of the metal objects to the non-metal objects to be introduced into a sensor of the metal sorter.

In one embodiment of the method for processing electronic and electrical device component scrap according to the present invention, the magnetic force sorting process is carried out such that the ratio of the number of the metal objects to the number of the non-metal objects to be introduced into the metal sorter is 2.0 or less.

In another embodiment of the method for processing electronic and electrical device component scrap according to the present invention, the magnetic force sorting process comprises magnetic force sorting processes in at least two stages.

In still another embodiment of the method for processing electronic and electrical device component scrap according to the present invention, the magnetic force sorting process comprises: a first magnetic force sorting step for removing iron scrap contained in the electronic and electrical device component scrap; and a second magnetic force sorting step having a higher magnetic force than that of the first magnetic force sorting step, the step being for removing component scrap and substrates, the component scrap and the substrate containing nickel and stainless steel, from the electronic and electrical device component waste from which the iron scrap has been removed.

In still another embodiment of the method for processing electronic and electrical device component scrap according to the present invention, the first magnetic force sorting step comprises applying a magnetic flux density of from 10 mT to 100 mT to the electronic and electrical device component scrap, and the second magnetic force sorting step comprises applying a magnetic flux density of from 300 mT to 1200 mT to the electronic and electrical device component scrap.

In still another embodiment of the method for processing electronic and electrical device component scrap according to the present invention, wind force sorting steps are carried out in at least two stages before the magnetic force sorting process.

In still another embodiment of the method for processing electronic and electrical device component scrap according to the present invention, the metal objects obtained in the metal sorting step is processed in the smelting step.

In another aspect, the present invention provides a method for processing electronic and electrical device component scrap, the method comprising a step of sorting substrate scrap in the electronic and electrical device component scrap using a color sorter comprising at least two camera units capable of identifying colors of front and back sides of processing objects.

In another embodiment of the method for processing electronic and electrical device component scrap according to the present invention, the at least two camera units of the color sorter comprises detecting a green color of the processing objects.

In still another embodiment of the method for processing electronic and electrical device component scrap according to the present invention, the substrate scrap is substrates containing metal objects.

In still another embodiment, the method for processing electronic and electrical device component scrap according to the present invention further comprises a separation step of subjecting the electronic and electrical device component scrap after removing the substrate scrap in the electronic and electrical device component scrap to separation of metal objects or non-metal objects in the electronic and electrical device component scrap using a metal sorter comprising a metal sensor, a camera unit, an air valve and a conveyor, wherein the separation step comprises sorting the substrate scrap in the electronic and electrical device component scrap using a color sorter such that a ratio of the number of objects determined to be the metal objects to objects determined to be the non-metal objects by the metal sensor (the metal objects/the non-metal objects) is 2.0 or less.

In still another embodiment of the method for processing electronic and electrical device component scrap according to the present invention, wind force sorting processes are carried out in at least two stages before the step of sorting the substrate scrap in the electronic and electrical device component scrap using the color sorter.

According to the present invention, it is possible to provide a method for processing electronic and electrical device component scrap, which can securely and efficiently sort the electronic and electrical device component scrap.

Further, according to the present invention, it is possible to provide a method for processing electronic and electrical device component scrap, which can increase an amount of electronic and electrical device component scrap processed in a smelting step and efficiently recover valuable metals.

DETAILED DESCRIPTION OF THE INVENTION

First Embodiment

Figure 1:
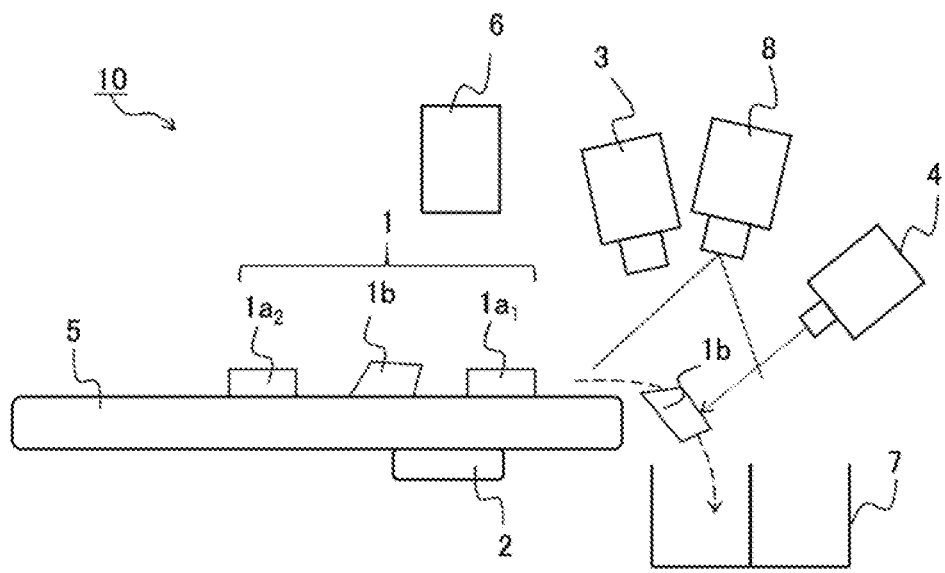
FIG. 1 is a schematic view of a sorter for use in a method for processing electronic and electrical device component scrap according to a first embodiment of the present invention.

Processing objects for electronic and electrical device component scrap 1 according to a first embodiment of the present invention are not particularly limited as long as they are raw materials containing at least non-metal objects and metal objects, and scrap obtained by crushing electronic and electrical devices such as PCs and mobile phones can be used.

Examples of the non-metal objects contained in the electronic and electrical device component scrap 1 according to the first embodiment include synthetic resins such as plastics, substrates and the like, which contain no metal or contain an amount of metals that is equal to or lower than a detection lower limit of a metal sensor 2 of a metal sorter 10 as described later. In the present embodiment, the substrates containing the amount of the metal that is equal to or lower than the detection lower limit of the metal sensor 2 is referred to as "resin-handling substrates", in order to be distinguished from general substrates containing metals.

The lower detection limit of the metal sensor 2 varies depending on sensitivity of the metal sensor 2 or positions (surface/interior) of the metals contained in the synthetic resins or the like. Higher sensitivity can suppress an amount of valuable metals contaminated into the non-metal objects, but it may decrease an amount of non-metal objects to be separated. On the other hand, lower sensitivity increases an amount of non-metal objects to be separated, but it may also increase the amount of valuable metals contaminated into the non-metal objects.

Examples of the metal objects include substrates containing metals such as wirings and leads on the surface or in the interior, parts such as ICs, wire scrap, and the like.

The electronic and electrical device component scrap 1 according to the first embodiment is preferably obtained by crushing a recovered raw material to have an appropriate size. In the present invention, the crushing for obtaining the electronic and electrical device component scrap may be performed by an operator. However, crushed objects may be purchased on the market. The raw material has any shape that is not particularly limited, and may have various shapes. For example, the raw material may include three-dimensional objects such as linear shaped, plate shaped, cylindrical shaped, pillar shaped, rectangular shaped, and irregular block shaped objects.

The crushing method is carried out using any apparatus that is not limited to a specific apparatus, and may be carried out in a sharing or shock manner. It is desirable to carry out crushing such that the shape of the component is maintained as much as possible. Therefore, the apparatus does not include one belonging to the category of a crusher for the purpose of fine crashing.

The electronic and electrical device component scrap 1 according to the first embodiment can be previously subjected to rough crushing to classify it into component scrap consisting of synthetic resins (plastics) used for substrates, wire scrap, parts such as PCs and connectors, metals and casings; wire scrap; metals; film-shaped component waste; powders generated by crushing or pulverizing; and others, and it can be further finely separated into individual components depending on purposes of the processing. This can provide more easy sorting of specific individual components by a metal sorter 10 as described later.

In the present embodiment, the electronic and electrical device component scrap 1 is preferably crushed to have a maximum particle diameter of about 100 mm or less, further about 50 mm or less, and has a characteristic particle diameter of from about 4 to 70 mm, or from about 4 to 50 mm. The "characteristic particle diameter" as used herein refers to an average value obtained by extracting arbitrary 100 points from the electronic and electrical device component scrap 1, calculating an average value of major axes of the extracted electronic and electrical device component scrap 1, and repeating this procedure five times.

—Metal Sorter 10—

FIG. 1 is a schematic view illustrating an example of a metal sorter according to the first embodiment. The present embodiment may include a separation step of separating non-metal objects $1b$ or metal objects $1a_1$, $1a_2$ from the electronic and electrical device component scrap 1 containing at least the metal objects $1a_1$, $1a_2$ and the non-metal objects $1b$, for example using a metal sorter 10 as shown in FIG. 1. It should be understood that that FIG. 1 is merely illustrative, and the positions of the members and the positional relationship between the members are, of course, not limited to the example of FIG. 1.

The metal sorter 10 includes: a metal sensor 2; a color camera 3; an air valve 4; and a conveyor 5. Provided in the vicinity of the color camera 3 is a color camera lighting device 8 for illuminating a field of view of the color camera 3. A near-infrared sensor 6 may be further provided at a position facing the metal sensor 2 across the conveyor 5, in order to improve a detection efficiency.

The metal sensor 2 of the metal sorter 10 detects the metal objects $1a_1$, $1a_2$ on the conveyor 5. The conveyor 5 then conveys and releases the metal objects $1a_1$, $1a_2$ and the non-metal objects $1b$, and the color camera 3 arranged on the downstream side of the metal sensor 2 in the conveying direction receives light reflected by the metal objects $1a_1$, $1a_2$ and the non-metal objects $1b$ struck by light emitted from the color camera lighting device 8 toward the optical detection position of the color camera 3 on a falling trajectory of the metal objects $1a_1$, $1a_2$ and the non-metal objects $1b$.

Immediately after that, information of an area where the metal objects $1a_1$, $1a_2$ that has been recognized by the metal sensor 2 are not present and positional information where the metal objects $1a_1$, $1a_2$ and the non-metal objects $1b$ that have been detected by the color camera are present are combined, whereby a determination means (not shown) of the metal sorter 10 determines the positions of the non-metal objects $1b$. Subsequently, based on the determination information of the non-metal objects $1b$, the air valve 4 arranged on the downstream side of the optical detection position of the color camera 3 blows air to the non-metal objects $1b$ to shoot down the non-metal objects $1b$, so that the non-metal objects $1b$ and the metal objects $1a_1$, $1a_2$ will be housed in separate sorting containers 7, respectively. It should be noted that the air valve 4 may blow air to the metal objects $1a_1$, $1a_2$ instead of the non-metal objects $1b$ to shoot down the metal objects $1a_1$, $1a2$.

As the metal sensor 2, a general-purpose sensor for detecting metals can be employed. For example, a sensor for detecting metals using electromagnetic induction can be preferably used. Specifically, the metal sensor 2 including one or more electromagnetic induction coils (not shown) can be used, and the detection range of the metal sensor 2 can be changed depending on the sizes of the electromagnetic induction coils.

Figure 2:
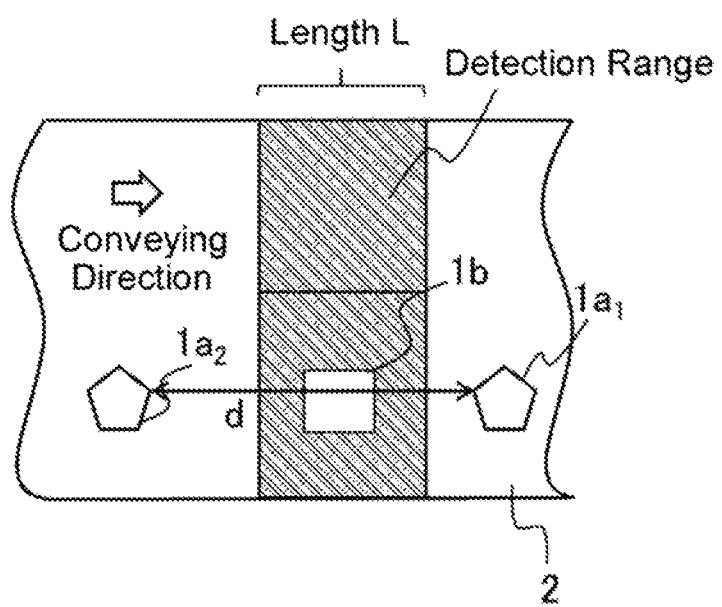
FIG. 2 is an explanatory view illustrating a mode where erroneous detection does not occur when metal objects in electronic and electrical device component scrap is detected by a metal sorter.

FIG. 2 shows a schematic view illustrating a positional relationship between the detection range of the metal sensor 2 and the electronic and electrical device component scrap 1. The detection range of the metal sensor 2 has a width that is equal to that of the conveyor 5 (in an up-down direction on the paper surface of FIG. 2), and has a length L along a moving direction of the conveyor 5, i.e., the conveying direction of the electronic and electrical device component scrap 1.

In the sorting of the metal objects $1a_1$, $1a_2$ and the non-metal objects $1b$ contained in the electronic and electrical device component scrap 1, the non-metal object $1b$ sandwiched between the metal objects $1a_1$, $1a_2$ may not be recognized as the non-metal objects $1b$ and may not be shot down by the air valve 4, when the non-metal object $1b$ is present between the metal objects $1a_1$ and the metal object $1a_2$, as shown in FIG. 2. This would be because when a distance between the metal object $1a_1$ and the metal object $1a_2$ adjacent to each other is too short, the metal object $1a_1$ and the metal object $1a_2$ are recognized as one metal object, so that the non-metal object $1b$ between the metal object $1_{a1}$ and the metal object $1a_1$ are not recognized as the non-metal $1b$. When the air valve 4 shoots down the metals, the non-metal object $1b$ may be recognized as the metal object and may be shot down.

In the present embodiment, when the metal objects $1a_1$, $1a_2$ in the electronic and electrical device component scrap 1 is detected by the metal sensor 1, a fixed distance d (the shortest distance) is at least provided between the metal object $1a_1$ and the metal object $1a_2$ adjacent to each other, so as to prevent the non-metal object $1b$ present between the metal object $1a_1$ and the metal object $1a_2$ adjacent to each other being form erroneously detected.

Specifically, as shown in FIG. 2, when the metal objects $1a_1$, $1a_2$ in the electronic and electrical device component scrap 1 is detected by the metal sensor 1, the positions of the metal objects $1a_1$, $1a_2$ are preferably adjusted such that the distance d between the metal object $1a_1$ and the metal object $1a_2$ with at least the non-metal object sandwiched between the metal object $1a_1$ and the metal object $1a_2$ is larger than the length L of the detection range of the metal sensor. This can allow the metal sensor 2 to recognize the metal object $1a_1$ and the metal object $1a_2$ as separate metal objects $1a_1$, $1a_2$, respectively, so that erroneous detection by the metal sensor 2 can be suppressed and the separation efficiency of the non-metal object $1b$ present between the metal objects $1a_1$, $1a_2$ can be further improved. Even if the non-metal object $1b$ is not present between the metal object $1a_1$ and the metal object $1a_2$, the fixed distance can be provided between the metal object $1a_1$ and the metal object $1a_2$ such that the fixed distance is larger than, specifically, the length L of the detection range of the metal sensor, so that a sorting efficiency between the metal objects $1a_1$, $1a_2$ and the non-metal objects $1b$ can be improved.

Figure 3:
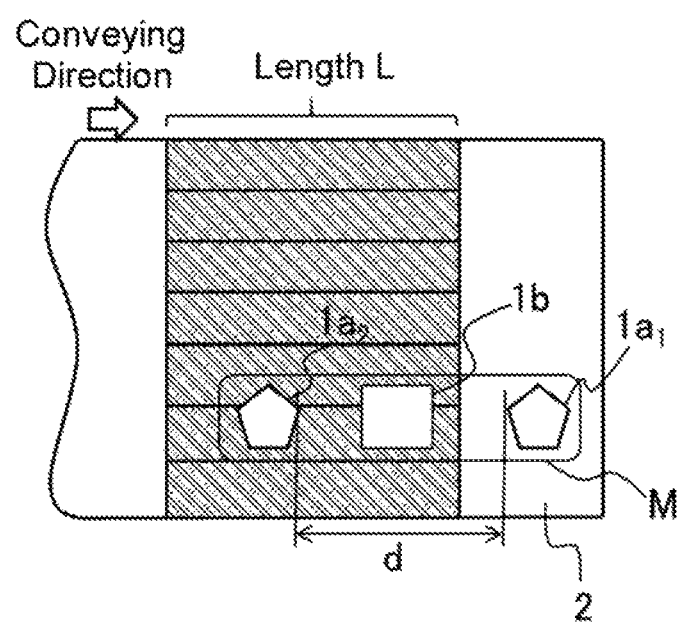
FIG. 3 is an explanatory view illustrating a mode where erroneous detection may occur when metal objects in electronic and electrical device component scrap is detected by a metal sorter.

On the other hand, if the distance d between the metal object $1a_1$ and the metal object $1a_2$ is equal to or less than the length L of the detection range of the metal sensor 2 as shown in FIG. 3, the metal sensor 2 may recognize the non-metal object $1b$ and the metal objects $1a_1$, $1a_2$ as single metal object M as a whole, whereby the non-metal object $1b$ may not be recognized as a foreign matter and the non-metal object $1b$ may not be separated.

The length L of the detection range of the metal sensor 2 belongs to the device and is not particularly limited. However, since the characteristic particle diameter of the electronic and electrical device component scrap targeted by the present invention is typically from 4 to 70 mm or less, the length L may preferably be from 4 mm to 200 mm, and more preferably from 20 mm to 60 mm. Since the air valve 4 continues to blow air while the non-metal objects are flowing, the number of the air blowing is relatively low if the length L is equivalent to the size of the non-metal object in the electronic and electrical device component scrap, while the number of air blowing will be very high if the length L is too small, so that the air may be lacked during operation. Therefore, it is necessary to increase the capacity of a compressor in order to prevent the lack of air. Accordingly, the length L is preferably selected according to the size of the non-metal object in the electronic and electrical device component scrap.

In order to separate the metal objects $1a_1$, $1a_2$ and the non-metal object $1b$ from each other to the extent that erroneous detection of the metal sensor 2 can be suppressed, it is preferable that the metal objects $1a_1$, $1a_2$ and the non-metal objects $1b$ are previously dispersed on the conveyor 5, such as by vibrating the conveyor 5.

A delivery speed of the conveyor 5 is 3 m/s in a fixed manner, but it may be in a variable manner. For example, it may vary between 1 and 5 m/s depending on the situations.

Even if the metal objects $1a_1$, $1a_2$ could be correctly detected by the metal sensor 2 and the position information of the non-metal objects $1b$ could be correctly recognized by the color camera, it would be difficult to shoot down the non-metal objects $1b$ to an appropriate position if an opening/closing speed of the air valve 4 is not properly adjusted.

In this embodiment, the opening/closing speed of the air valve 4 is preferably from 0.5 to 4 ms/cycle, and more preferably from 2 to 4 ms/cycle.

According to the method for processing the electronic and electrical device component scrap 1 according to the first embodiment, the metal sorter 10 can effectively sort the metal objects $1a_1$, $1a_2$ including valuable metal-handling substrates containing a large amount of metal components such as wirings and leads on the surface or in the interior, and the non-metal objects $1b$ including the resin-handling substrates containing no metal or containing a trace amount of metal on the surface or in the interior.

Since the substrates containing valuable metals such as copper and precious metals are concentrated in the sorted metal objects $1a_1$, $1a_2$, the sorted objects including the metal objects $1a_1$, $1a_2$ can be processed as processing objects in a smelting step to improve a recovery efficiency of valuable metals. On the other hand, since the separated objects separated as the non-metal objects $1b$ include the resin-handling substrates containing Sb that is a smelting inhibitor, substances that will inhibit the processing in the smelting step are prevented from being contaminated into the smelting step, so that a processing efficiency in the smelting process can be improved.

(Pre-Processing)

The electronic and electrical device component scrap 1 is further subjected to a certain pre-processing prior to the processing by the metal sorter 10 according to the present embodiment, so that the sorting efficiency of the metal objects $1a_1$, $1a_2$ and the non-metal objects $1b$ in the electronic and electrical device component scrap 1 can be further improved. For example, the sorting efficiency of the metal objects $1a_1$, $1a_2$ and the non-metal objects $1b$ can be improved by adjusting a ratio of the metal objects $1a_1$, $1a_2$ to the non-metal objects $1b$ contained in the electronic and electrical device component scrap 1 so as to be 70:30 to 20:80, before detecting the metal objects $1a_1$, $1a_2$ in the electronic and electrical device component scrap 1 by the metal sensor 1.

Further, before detecting the metal objects $1a_1$, $1a_2$ in the electronic and electrical device component scrap 1 by the metal sensor 2, the method according to the embodiment includes a step of removing powdery materials contained in the electronic and electrical device component scrap 1, so that blowing-up of the powdery materials can be suppressed during the processing. This can allow the processing objects to be easily observed upon observation of the position of the processing objects by the color camera 3, so that the sorting efficiency can be improved.

As the pre-processing, for example, before the electronic and electrical device component scrap 1 is processed by the metal sorter 10, the electronic and electrical device component scrap 1 is subjected to a wind force sorting process, and light weight objects sorted in the wind power sorting process can be the processing objects according to the present embodiment.

It is preferable that the wind force sorting process is carried out in at least two stages, although it depends on the materials contained in the electronic and electrical device component scrap 1. When separating noble metal-containing objects such as substrates and ICs, and metals containing Fe, Al, and the like, from the electronic and electrical device component scrap 1, a flow rate of air is preferably from 10 to 18 m/s, and further preferably from 15 to 18 m/s. The optimum flow rate of air is preferably from 5 to 15 m/s, and more preferably from 8 to 12 m/s, in order to improve the concentration of the condenser and the fraction of the metals. When previously separating films, powdery material, and the like, which would affect the erroneous detection of the color camera or the near-infrared sensor of the metal sorter 10 as described above, the flow rate of air is preferably from 5 to 8 m/s, and further preferably from 6 to 7 m/s.

Second Embodiment

A method for processing electronic and electrical device component scrap according to a second embodiment of the present invention includes a metal sorting step of sorting metal objects or non-metal objects using a metal sorter (a metal sorter 10) as a final step of physical sorting before introducing the electronic and electrical device component scrap into a smelting step, and the metal sorting step includes carrying out a magnetic force sorting process as pre-processing of the metal sorting step to adjust a ratio of the number of the metal objects to the non-metal objects to be introduced into the metal sensor 2 of the metal sorter.

The "electronic and electrical device component scrap" according to the second embodiment refers to scrap obtained by crushing electronic and electrical devices such as waste home electric appliances, PCs, and mobile phones, recovering them and then crushing them to have an appropriate size. In the present invention, the crushing for obtaining the electronic and electrical device component scrap may be performed by an operator. However, crushed objects may be purchased on the market.

The crushing method is carried out by any apparatus that is not limited to a specific apparatus, and may be carried out in a sharing or shock manner. It is desirable to carry out crushing such that the shape of the component is maintained as much as possible. Therefore, the apparatus does not include one belonging to the category of a crusher for the purpose of fine crashing.

The electronic and electrical device component scrap according to the second embodiment can be classified into component scrap consisting of synthetic resins (plastics) used for substrates, parts such as ICs and connectors, and casings; wire scrap; metals; film-shaped component scrap; powdery materials generated by crushing or pulverizing; and others, and they can be further classified into subclasses depending on purposes of the processing. In the present embodiment, the electronic and electrical device component scrap that has been crushed to have a particle diameter of 100 mm or less, more preferably 50 mm or less, and has a percentage of individual components separated as component scrap of 70% or more may preferably be processed, although not limited thereto.

By sorting the metal objects or non-metal objects using the metal sorter as the final step of physical sorting before introducing the electronic and electrical device component scrap into the smelting step, valuable metals such as copper, gold and silver suitable for processing in the copper smelting step can be concentrated on the metal object side to allow substances which may adversely affect the copper smelting step such as antimony (Sb), nickel (Ni), aluminum (Al) and iron (Fe) to transfer to the non-metal object side. This can allow a recovery efficiency of valuable metals to be increased while preventing substances that will affect the quality of products or by-products in a copper smelting process and/or smelting inhibitors that will affect the copper smelting process from being contaminated into the copper smelting step.

Depending on the type of the component scrap of the processing objects introduced into the metal sorter used in the metal sorting step, the sorting by the metal sorter may not be successfully performed. As a result of the studies, the present inventors have found that when a non-metal object such as synthetic resins is present between metal scrap detected as a metal object and metal scrap detected as a metal object in the processing using the metal sorter provided with the metal sensor for sorting the metal object and non-metal object, they may be erroneously detected as a single metal by the metal sensor 2 when a distance between the metal scrap detected as the metal object and the metal scrap detected as the metal object is within the detection range of the metal sorter. As a result, they have found that the non-metal object that should actually exist between the metal object and the metal object is not removed, leading to a phenomenon of a decrease in a separation efficiency. They have also found that as a method of suppressing this phenomenon, it is preferable to adjust contents of metals in the processing objects introduced into the metal sorting step.

Therefore, in the processing method according to the second embodiment of the present invention, the magnetic force sorting process is carried out as the pre-processing for the metal sorting step using the metal sorter 10 provided with the metal sensor 2 according to the first embodiment. By the magnetic force sorting process, the ratio of the number of the metal objects to the non-metal objects introduced into the metal sorter is adjusted such that the ratio of the contents of the metal objects is equal to or less than a predetermined ratio. This can lead to further improvement of the separation efficiency of the metal objects and the non-metal objects in the metal sorting step. Therefore, the concentration of valuable metals can be increased while keeping the concentration of smelting inhibitors in the metal objects obtained in the metal sorting step at a lower level.

In the present embodiment, a substance that can be detected as a metal by the metal sensor 2 of the metal sorter used in the metal sorting step is defined as a "metal object", and a substance that is not detected as a metal by the metal sensor 2 is defined as a "non-metal object".

Among the electronic and electrical device component scrap containing various components, in particular the substrates may be detected as both the "metal objects" and the "non-metal objects" by the metal sensor 2, because the substrates have wirings and metal components remain on the surfaces, which remain in various states.

In the present embodiment, the substrates containing an amount of metal that is equal to or less than the detection lower limit of the metal sensor 2, i.e., the substrates detected as the "non-metal objects" by the metal sensor 2, are referred to as "resin-handling substrates". The resin-handling substrates have a higher content of solder resist than substrates containing a large amount of metal. This solder resist may contain Sb, which would be an inhibitor for the smelting step. Previous removal of such resin-handling substrates from the raw materials sent to the smelting step can lead to prevention of substances that may adversely affect the smelting step from being contaminated into the smelting step. Examples of the "non-metal objects" include plastic pieces forming casings and the like, in addition to the resin-handling substrates as described above.

Examples of the metal objects include substrates containing metals such as wirings and leads on the surfaces or in the interiors, metals such as iron and stainless steel, parts such as ICs, and wire scrap.

In order to be able to always perform stable processing regardless of the type and state of the component scrap in the metal sorting step, the magnetic force sorting process is preferably carried out such that the ratio of the number of metal objects/non-metal objects is 2.0 or less, and more preferably 1.0 or less, and even more preferably 0.3 or less.

The magnetic force sorting process preferably includes magnetic force sorting processes in at least two steps. Specifically, the magnetic force sorting process preferably includes: a first magnetic force sorting step for removing iron scrap contained in the electronic and electrical device component scrap; and a second magnetic force sorting step having a higher magnetic force than that of the first magnetic force sorting step, for further removing lead wires containing ferromagnetic substances such as iron and nickel and/or substrates having electronic device components attached to the surfaces from the electronic and electrical device component scrap from which the iron scrap have been removed.

The processing objects before implementing the magnetic force sorting step contain synthetic resins used for substrates, parts and casings, wire scrap, metals, film-shaped parts scrap, powder materials generated by crushing or pulverizing, and the like. In particular, in view of the metal sorting step after the magnetic sorting step, when a large number of iron scrap, substrates having a lot of lead wires, solders, and the like, which remain on the surface, are contained in the processing object, the ratio of the metal contents in the processing objects to be processed by the metal sorter is increased, and the erroneous detection of the metal sorter easily occurs, resulting in a difficulty to separate the metal objects and the non-metal objects. Further, the magnetic flux density of the first magnetic force sorting step lower than that of the second magnetic force sorting step can lead to prevention of the component scrap containing a large amount of ferromagnetic substances such as Fe from being contaminated into the magnetic force sorter used in the second magnetic force sorting step, thereby prolonging lives of a shell that covers a magnet, a conveyor belt, and the like. Furthermore, the metals sorted in the first and second magnetic force sorting steps can be classified into iron and stainless steel, respectively, to improve the material purity of the metal in the sorted material.

In the first magnetic force sorting step, first, the component scrap (iron scrap) containing metals such as Fe is preferably removed from the processing objects. For example, in the first magnetic force sorting step, a suspension type magnetic separator is used and a magnetic flux density applied to the targeted component scrap is set to 10 mT to 100 mT, and more preferably 20 mT to 50 mT, although not limited thereto.

In the second magnetic force sorting step, nickel that is a smelting inhibitor and/or stainless steel and substrates that are liable to generate erroneous detection of the metal sorter as described later are preferably removed from the electronic and electrical device component scrap from which the iron scrap has been removed. For example, in the second magnetic force sorting step, a high magnetic force sorter is used and a magnetic flux density applied to the targeted component scrap is set to 300 mT to 1200 mT, and more preferably 600 mT to 800 mT, although not limited thereto. If the magnetic flux density is too low, an removal amount of objects desired to be removed such as the substrates will be decreased, while if the magnetic flux density is too high, non-objects that are not desired to be removed, such as the synthetic resins containing a small amount of magnetic materials such as iron powder on the surface or in the interior, are contaminated into the objects.

The magnetic force sorting step can, of course, be completed in one stage of the magnetic force sorting step, or the magnetic force sorting can be performed in three or more stages, depending on the type and state of the processing objects.

From the processing objects obtained by the magnetic force sorting process, the metal objects or non-metal objects are separated using the metal sorter. The metal sorter can include a metal sensor, a color camera, an air valve, and a conveyor. The color camera detects positions of the metal objects detected by the metal sensor or the non-metal objects that are not detected by the metal sensor, and the air valve blows air toward the metal objects or the non-metal objects, so that the metal objects and the non-metal objects are sorted into separate containers, respectively. The metal objects thus sorted can be sent to a smelting step and processed in a copper smelting step using a smelting furnace.

According to the method for processing the electronic and electrical device component scrap according to the second embodiment of the present invention, the ratio of the metal contents in the processing objects to be introduced into the metal sorter can be decreased by carrying out the magnetic force sorting step prior to the metal sorting step, so that the erroneous detection of the metal sorter can be reduced. Furthermore, Ni and Fe, which are one of the smelting inhibitors, can be removed in advance in the magnetic force sorting process, so that an introduced amount of the component scrap containing valuable metals can be increased while keeping the concentration of the smelting inhibitors in the objects to be processed in the smelting step at a lower level. Consequently, an amount of electronic and electrical device component scrap to be processed in the smelting step can be increased to enable the valuable metals to be efficiently recovered.

(Other Sorting Process)

In addition to the above sorting processes, the following sorting process can be combined as appropriate. For example, depending on the type of the electronic and electrical device component scrap, a large amount of wire scrap may be contained so that it can be easily identified by visual inspection. In this case, the electronic and electrical device component scrap can be first subjected to a process to remove relatively large wire dust or the like by manual sorting or mechanical sorting by means of a robot or the like.

Prior to the magnetic force sorting process as described above, wind force sorting steps are preferably carried out in two stages. For example, in a first wind force sorting step, powdery materials and film-shaped component scrap (resins, aluminum foils, and the like) as materials that will adversely affect the subsequent sorting step are sorted and removed from the electronic and electrical device component scrap as the raw material. By the first wind force sorting, the electronic and electrical device component scrap is divided into light-weight materials and heavy-weight materials. The powdery materials and film-shaped waste (resins, aluminum foils, and the like) as the light-weight materials are sent to the copper smelting step via a pre-incineration processing step, and the heavy-weight materials are sent to a second wind force sorting step.

In the first wind force sorting step, a flow rate of air can be set to 5 to 20 m/s, more preferably 5 to 12 m/s, further preferably about 5 to 10 m/s, and even more preferably 6 to 8 m/s, although not limited to those conditions.

In the second wind force sorting step, massive metals and single component are separated as heavy-weight materials from the electronic and electrical device component scrap from which the powdery materials and the film-shaped component scrap have been removed, and substrates, plastics and parts are concentrated on the light-weight material side. A concentrate containing the concentrated substrates, synthetic resins and the like on the light-weight material side is preferably processed in the magnetic force sorting process according to the present embodiment.

In the second wind force sorting step, a flow rate of air can be set to 5 to 20 m/s, more preferably 10 to 18 m/s, further preferably 15 to 18 m/s, and even more preferably about 16 to 17 m/s, although not limited to those conditions.

If the powdery materials have not been sufficiently sorted by the first wind force sorting step, a sieving step is preferably added between the first wind force sorting step and the second wind force sorting step, or before or after the second wind force sorting step, to further sort and remove the powdery materials. It is preferable to use a slit-shaped net having long holes in a moving direction as a sieve in that sieving step, and in this case, the conductive wire scrap can also be removed. The sieved powdery materials and conductive wire scrap can be sent to the copper smelting step via the pre-incineration processing step, thereby more efficiently recovering the valuable metals in the component scrap.

In addition, the "removed" or "separated" in the second embodiment includes not only an embodiment of removal or separation of 100%, but also an embodiment of removal of 30% or more, more preferably 50% by mass or more in the weight ratio in the objects.

In the second embodiment, the electronic and electrical device component scrap was used as a raw material, and this electronic and electrical device component scrap was subjected to the wind force sorting at 7 m/s to obtain the light-weight materials, which were sieved using a vibrating sieve machine, and then subjected to further wind force sorting at 17 m/s to sort the component scrap containing the substrates and the synthetic resins on the light-weight material side. The component scrap was subjected to the magnetic force sorting process according to the present embodiment. The magnetic force sorting was carried out in two stages. First, the suspending type magnetic sorter was used to apply a magnetic flux density of 40 mT to the processing objects to remove the iron scrap. Then, the high magnetic force sorter was used to apply a magnetic flux density of 600 mT to the processing objects with removed iron scrap to remove the component scrap containing nickel and stainless steel, and the substrates having lead wires and electronic parts containing ferromagnetic substances such as iron and nickel attached to the surfaces. The component scrap after the second magnetic force sorting had a ratio of the number of metal objects/non-metal objects of about 0.25. The component scrap was processed using the metal sorter having a conveyor belt width of about 1 m at a processed amount of 1.0 t/h, and as a result, about 80% of the synthetic resins in the processing objects could be removed.

Third Embodiment

A method for processing electronic and electrical device component scrap according to a third embodiment of the present invention includes a step of sorting substrate scrap in the electronic and electrical device component scrap using a color sorter 100 including at least two camera units 30*a*, 30*b* which can identify colors on front and back sides of a processing object.

The "electronic and electrical device component scrap" according to the third embodiment refers to scrap obtained by crushing electronic and electrical devices such as waste home electric appliances, PCs, and mobile phones, recovering them and then crushing them to have an appropriate size. In the present invention, the crushing for obtaining the electronic and electrical device component scrap may be performed by an operator. However, crushed objects may be purchased on the market.

The crushing method is carried out by any apparatus that is not limited to a specific apparatus, and may be carried out in a sharing or shock manner. It is desirable to carry out crushing such that the shape of the component is maintained as much as possible. Therefore, the apparatus does not include one belonging to the category of a crusher for the purpose of fine crashing.

In the third embodiment, the electronic and electrical device component scrap is preferably crushed to have a maximum particle diameter of about 100 mm or less, further about 50 mm or less. Further, it is preferable that the raw materials of the electronic and electrical device component scrap according to the present embodiment is roughly crushed in advance to be separated into individual components in the form of capacitors, plastics, substrates, wire scrap, ICs, connectors, metals and the like.

The electronic and electrical device component scrap according to the second embodiment can be classified into component scrap consisting of synthetic resins (plastics) used for substrates, parts and casings; wire scrap; metals; film-shaped component scrap; powdery materials generated by crushing or pulverizing; and others, and they can be further classified into subclasses depending on purposes of the processing. In the present embodiment, the electronic and electrical device component scrap that has a percentage of individual components separated as component scrap of 70% or more may preferably be processed, although not limited thereto.

In particular, as the processing object by the color sorter according to the third embodiment, materials obtained by subjecting the electronic and electrical device component scrap described above to wind force sorting to remove the powdery materials and the film-shaped component scrap are preferably processed. The previous removal of the powdered materials and light-weight materials such as film-shaped material scrap from the electronic and electrical device component scrap by wind force sorting can suppress a decrease in detection ability of camera units of a color sorter or a metal sorter as described later due to low visibility caused by blowing up the powdery materials and the film-shaped material scrap within the color sorter or the metal sorter.

Further, the previous removal of the powdery materials and light-weight materials such as film-shaped component scrap from the electronic and electrical device component scrap by the wind force sorting can increase a ratio of the content of the metal-containing component scrap such as synthetic resins, metals, substrates, ICs and capacitors.

The wind force sorting is preferably carried out in at least two stages. First, in the first stage of wind force sorting, the powdery materials and film-shaped component scrap (resins, aluminum foils, and the like) that may adversely affect the sorting ability of the color sorter according to the present embodiment can be removed. In the wind force sorting step in the first stage, a flow rate of air can be set to 5 to 20 m/s, more preferably 5 to 12 m/s, further preferably about 5 to 10 m/s, and even more preferably 6 to 8 m/s, for example.

In the wind force sorting in the second stage, the sorting is preferably carried out for the purpose of concentrating the synthetic resins and the substrates from the electronic and electrical device component scrap from which the powdery materials and the film-shaped component scrap have been removed. In the wind force sorting in the second stage, a flow rate of air can be set to 5 to 20 m/s, more preferably 10 to 18 m/s, further preferably 15 to 18 m/s, and even more preferably about 16 to 17 m/s, for example.

It is more preferable to further carry out a sieving process using a sieving machine having a slit-shaped sieve, between the first stage wind force sorting and the second stage wind force sorting. By carrying out the sieving process after the first stage wind force sorting, liner component scrap such as linear waste can be removed from the electronic and electrical device component scrap from which the powdery materials and the film-shaped component scrap have been removed. Therefore, in the second stage wind force sorting, the contents of the synthetic resins and the substrates in the processing object can be further increased, and the load of the subsequent sorting process due to contamination of wire scrap can be reduced.

It was found that if the processing objects having the concentrated synthetic resin and substrate contents thus obtained are directly used to sort the metal objects and the non-metal objects, for example using the metal sorter, the non-metal objects are difficult to be removed, and the metal objects may not be recovered with a high efficiency.

In the method for processing the electronic and electrical device component scrap according to the third embodiment, the substrate scrap can be selectively removed from the component scrap containing synthetic resins, parts such as ICs, metals, and substrates by using a color sorter 100 as described later. The present inventors have found that this facilitates the concentration of the metal objects in the subsequent processing using the metal sorter.

The method for processing the electronic and electrical device component scrap according to the third embodiment includes a separation step of separating the metal objects or the non-metal objects in the electronic and electrical device component scrap using a metal sorter including a metal sensor, camera units, an air valve and a conveyor for the electronic and electrical device component scrap from which the substrate scrap in the electronic and electrical device component scrap has been removed, and in the step, the substrate scrap containing the metal objects is selectively removed from the electronic and electrical device component scrap using a color sorter 100 such that a ratio of the number of objects determined to be the metal objects to the number of objects determined to be the non-metal objects by the metal sensor of the metal sorter (metal objects/non-metal objects) is 2.0 or less. This facilitates the concentration of the metal objects in the processing using the metal sorter after the sorting process using the color sorter 100 according to the present embodiment.

Figure 4:
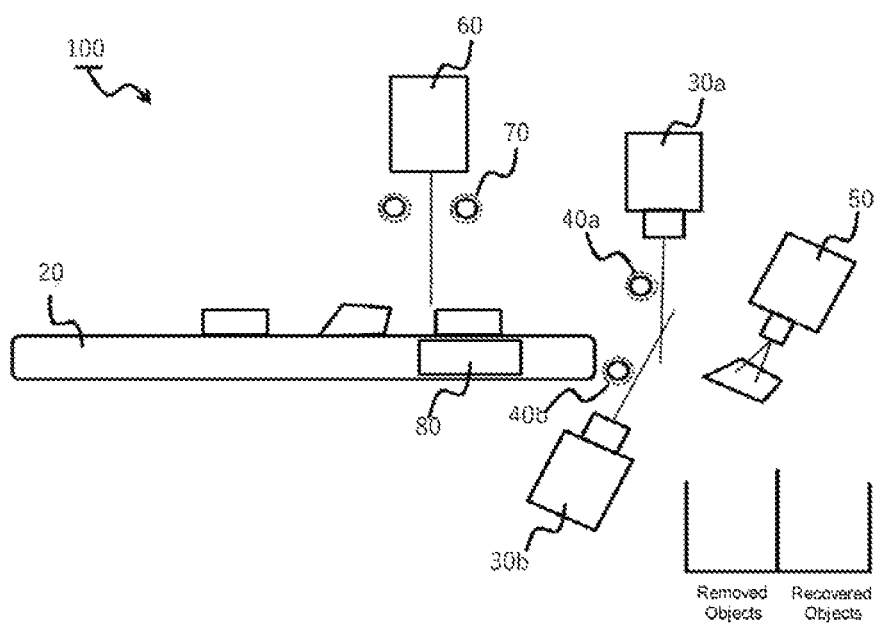
FIG. 4 is a schematic view illustrating a structure of a color sorter according to a third embodiment of the present invention.

FIG. 4 shows an example of the color sorter 100 according to the third embodiment. The color sorter 100 according to the third embodiment includes: a feeder (not shown) for applying vibration to the processing objects as needed; a conveyor 20 for conveying the processing objects fed from the feeder; at least two camera units 30*a*, 30*b* for identifying colors of front and back surfaces of the processing object on a falling trajectory discharged from the conveyor 20; and air nozzle for blowing air to detection objects that are detected as removing objects by the camera units 30*a*, 30*b* to shoot down the detection objects into a container on the removing object side.

The color sorter 100 may further include: a controller (not shown) for adjusting a pressure of air (air pressure) jetted from the air nozzle 50; camera unit lighting devices 40$a$, 40$b$ provided near the camera units 30$a$, 30$b$ and illuminating the field of view of the camera units 30$a$, 30$b$; a metal sensor 80 provided at a lower portion of the conveyer 20 and for detecting the metal objects in the processing objects; a near-infrared sensor 60 that can detect positions of the processing objects; and near-infrared sensor lighting devices 70 provided near the near-infrared sensor 60, and the like.

There are two types of substrates which are objects to be sorted, those in which front and back surfaces are covered with solder resist, and those in which one surface is covered with solder resist. In general, the surface covered with the solder resist has a green color, and the surface that is not covered with the solder resist has a brown color. By setting the detection color to the green color in the color sorter 100, the surface covered with the solder resist can be detected to remove the substrates selectively.

In the conventional device in which the camera unit is in a position to identify the color of only one of the front surface and the back surface of the processing object, it is necessary to set the detection color so as to identify the colors of both the front surface and the back surface of the processing object. When detecting a substrate covered with solder resist only on one side by such a conventional camera unit, it is necessary to set the detection colors to a green color on the surface covered with solder resist and a brown color on the surface that is not covered with solder resist, but the erroneous detection such as detection of brown or dirty white plastics (synthetic resins) as the substrates is likely to occur.

On the other hand, when the camera units 30$a$, 30$b$ are located at positions where the colors of both the front surface and the back surface of the processing object are identified as in the color sorter 100 shown in FIG. 4, it is sufficient to set the detection colors of the camera units 30$a$, 30$b$ such that only one of the front surface and the back surface of the processing object is identified. When the camera units 30$a$, 30$b$ detect the substrate covered with solder resist only on one side, the detection color is set to the green color of the surface covered with solder resist, so that the substrates can be selectively removed while preventing the plastics (synthetic resins) from being erroneously detected. The detection color is preferably the green color, which is the current standard color of the solder resist, but detection colors may be added depending on color tones of the substrates to be sorted. For example, a red color, a blue color, a black color, a white color and the like may be added as the detection colors depending on the colors of the substrates to be sorted.

According to the color sorter 100 of the present embodiment, the color sorter 100 in which at least two camera units 30$a$, 30$b$ capable of identifying the colors of the front and back surfaces of the processing object are arranged below and above the conveyor 20 can be used to detect the colors of both of the front and back surfaces of each processing object, so that the erroneous detection of objects other than the substrates to be removed can be reduced. The detection ranges of the camera units 30$a$, 30$b$ are not particularly limited, but the erroneous detection may occur if the detection ranges are too large or too small.

Figure 5:
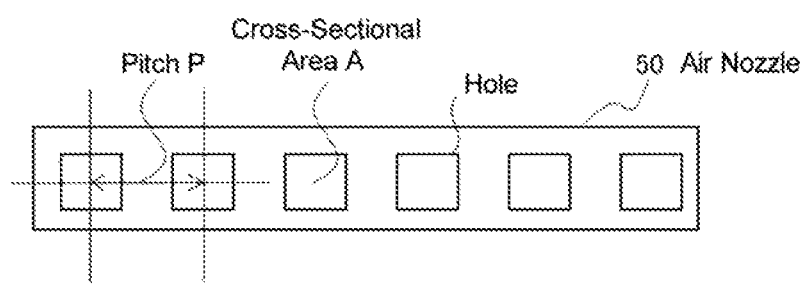
FIG. 5 is an explanatory view illustrating a cross-sectional area and a pitch of holes included in an air nozzle.

It is also necessary to optimize the air nozzle 50 in order to remove the substrates from the electronic and electrical device component scrap with a high efficiency. In the present embodiment, for example, as shown in FIG. 5, it is preferable to use an air nozzle having a plurality of holes to blow air to the substrate scrap and to guide the substrates to a container on the removing object side.

If a nozzle cross-sectional area A and a pitch P are too large, there is a risk that the component scrap other than the substrates may be shot down to the removing object side, whereas if they are too small, the substrates may not be appropriately shot down to the container on the removing object side. The nozzle cross-sectional area A of the air nozzle 50 is preferably from 2 to 6 mm$^2$, and more preferably from 3 to 5 mm$^2$. The pitch P of the air nozzles 50 is preferably from 2 to 8 mm, and more preferably from 3 to 6 mm.

In order to properly separate the substrates into the container on the removing side by using the air nozzle 50, a spray distance of the air jetted from the air nozzle 50 is preferably from 5 to 50 mm, and more preferably from 5 to 30 mm, and even more preferably from 5 to 10 mm.

Further, in order to properly separate the substrates into the container on the removing side using the air nozzle 50, a pressure of air jetted from the air nozzle 50 is preferably from 0.1 to 1.0 MPa, and more preferably from 0.3 to 0.7 MPa, and even more preferably from 0.3 to 0.5 MPa. Although each hole of the air nozzle 50 has a rectangular shape in FIG. 5, the shape is not limited to the rectangular shape, and may be a circular shape, an elliptical shape, or a slit shape.

Thus, according to the method for processing the electronic and electrical device component scrap according to the third embodiment, it is possible to increase the amount of the electronic and electrical device component scrap to be processed in the smelting step, and to recover valuable metals efficiently.

In the third embodiment, the processing object containing 25% of synthetic resins, 53% of substrate scrap, 1% of metals, and 21% of other objects in mass ratio was prepared by subjecting the electronic and electrical device component scrap that has been crushed to have a maximum diameter of 50 mm or less to the wind force sorting and sieving process in the two stages. The processing object was subjected to a process of removing the substrates using the color sorter 100 according to the present embodiment. The sorting process was carried out under conditions where the identification colors of the two camera units of the camera units set to the green color corresponding to the solder resist color of the substrates, the nozzle cross-sectional area A of the air nozzle was set to 5 mm$^2$, the pitch P was set to 5 mm, the spray distance was set to 20 mm, and the air pressure was set to 0.3 MPa, and the type of the component scrap in the recovered objects recovered in the container on the recovering object side was identified. As a result, the type was as follows: 53% of synthetic resins, 9% of substrate scrap, 3% of metals, and 35% of the others, and the substrates scrap could be properly removed. We investigated the ratio of the number of objects determined to be the metal objects to the number of the objects determined to be the non-metal objects by the metal sensor of the metal sorter for further processing that recovered objects (metal objects/non-metal objects), indicating the ratio of the numbers was 0.6. In addition, the component scrap obtained by the color sorter according to the present embodiment was processed at a processing amount of 2.0 t/h using the metal sorter having a conveyor belt width of about 0.6 m, indicating that about 66% of the synthetic resins in the processing objects could be removed.

While the present invention has been described using the first to third embodiments, the present invention is not limited to the above embodiments, and can be embodied by modifying elements without departing from the spirit of the invention. Further, various inventions can be formed by appropriately combining a plurality of elements disclosed in the above embodiments. For example, some elements may be deleted from all the elements shown in the embodiments. Furthermore, the elements of different embodiments may be combined as needed.

DESCRIPTION OF REFERENCE NUMERALS 1 electronic and electrical device component scrap
1b non-metal object
1a1, 1a2 metal object
2 metal sensor
3 color camera
4 air valve
5 conveyor
6 near-infrared sensor
7 sorter
8 color camera lighting device
10 metal sorter
20 conveyor
30a, 30b camera unit
40a 40b camera unit lighting device
50 air nozzle
60 infrared sensor
70 infrared sensor lighting device
80 metal sensor
100 color sorter

The invention claimed is:

1. A method for processing electronic and electrical device component scrap, the method comprising:
a separation step of separating non-metal objects or metal objects from electronic and electrical device component scrap containing the metal objects and the non-metal objects using a sorter, the sorter comprising: a metal sensor; a color camera; an air valve; and a conveyor,
wherein if a non-metal object is sandwiched between the metal objects and a distance between the metal objects sandwiching the non-metal object is less than a fixed distance, a new distance which is larger than the fixed distance is provided between the metal objects so as to prevent the non-metal objects between the metal objects from being erroneously detected, when detecting the metal objects in the electronic and electrical device component scrap by the metal sensor.

2. The method for processing electronic and electrical device component scrap according to claim 1, wherein the fixed distance is larger than a length of a detection range for the metal sensor in a direction along a conveying direction of the electronic and electrical device component scrap.

3. A method for processing electronic and electrical device component scrap, the method comprising:
a separation step of separating non-metal objects or metal objects from electronic and electrical device component scrap containing the metal objects and the non-metal objects using a sorter, the sorter comprising: a metal sensor; a color camera; an air valve; and a conveyor,
wherein if a distance between the metal objects in which a non-metal object is at least present between the metal objects is larger than a length of a detection range for the metal sensor in a direction along a conveying direction of the electronic and electrical device component scrap, a new distance which is larger than the length of the detection range is provided between the metal objects sandwiching the non-metal object so as to prevent the non-metal objects between the metal objects from being erroneously detected, when detecting the metal objects in the electronic and electrical device component scrap by the metal sensor.

4. The method for processing electronic and electrical device component scrap according to claim 1, wherein the length of the detection range for the metal sensor is from 4 to 200 mm.

5. The method for processing electronic and electrical device component scrap according to claim 1, wherein an opening/closing speed of the air valve is from 0.5 to 4 ms/cycle.

6. The method for processing electronic and electrical device component scrap according to claim 1, wherein the electronic and electrical device component scrap has a characteristic particle diameter of from 4 to 70 mm.

7. The method for processing electronic and electrical device component scrap according to claim 1, further comprising removing powdery materials contained in the electronic and electrical device component scrap before detecting the metal objects in the electronic and electrical device component scrap by the metal sensor.

8. The method for processing electronic and electrical device component scrap according to claim 1, wherein the method comprising carrying out a magnetic force sorting process as a pre-processing of the metal sorting step before detecting the metal objects in the electronic and electrical device component scrap by the metal sensor, and wherein the magnetic force sorting process is carried out such that a ratio of the number of the metal objects to the number of the non-metal objects to be introduced into the metal sorter is 2.0 or less.

9. The method for processing electronic and electrical device component scrap according to claim 8, wherein the magnetic force sorting process comprises magnetic force sorting processes in at least two stages.

10. The method for processing electronic and electrical device component scrap according to claim 1, wherein the method comprises, before the separation step, a step of sorting substrate scrap in the electronic and electrical device component scrap using a color sorter, the color sorter comprising at least two camera units capable of identifying colors of front and back sides of processing objects, such that a ratio of the number of the metal objects to the number of the non-metal objects to be introduced into the metal sensor (the metal objects/the non-metal objects) is 2.0 or less.

11. The method for processing electronic and electrical device component scrap according to claim 10, wherein wind force sorting processes are carried out in at least two stages before the step of sorting the substrate scrap in the electronic and electrical device component scrap using the color sorter.

12. The method for processing electronic and electrical device component scrap according to claim 1, further comprising a step of processing the electronic and electrical device component scrap after separating the non-metals in a smelting step.

* * * * *

UNITED STATES PATENT AND TRADEMARK OFFICE
CERTIFICATE OF CORRECTION

PATENT NO. : 11,554,388 B2
APPLICATION NO. : 16/981649
DATED : January 17, 2023
INVENTOR(S) : Katsushi Aoki et al.

It is certified that error appears in the above-identified patent and that said Letters Patent is hereby corrected as shown below:

On the Title Page

Please change:
"(73) Assignee: JX NIPPON MINING & METALS COPPORATION, Tokyo (JP)"
To:
-- (73) Assignee: JX NIPPON MINING & METALS CORPORATION, Tokyo (JP) --

Signed and Sealed this
Twenty-fifth Day of April, 2023

Katherine Kelly Vidal
*Director of the United States Patent and Trademark Office*